(No Model.)
J. FISH.
HACK SAW FRAME.
No. 538,159.  Patented Apr. 23, 1895.
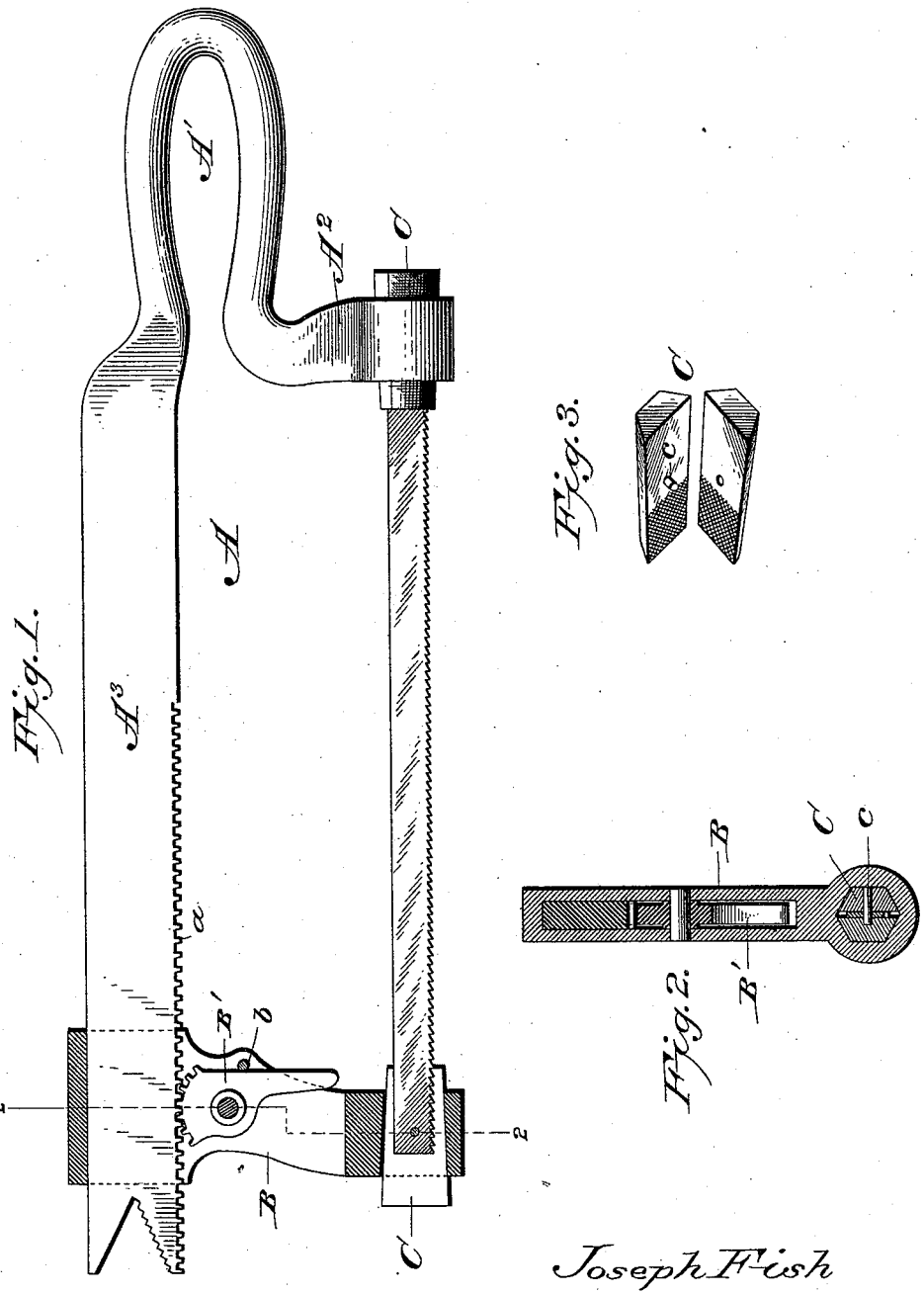
WITNESSES
G. S. Elliott
T. W. Johnson
Joseph Fish
INVENTOR
by [signature]
Attorney

UNITED STATES PATENT OFFICE.

JOSEPH FISH, OF CHICAGO, ILLINOIS.

HACK-SAW FRAME.

SPECIFICATION forming part of Letters Patent No. 538,159, dated April 23, 1895.

Application filed January 10, 1895. Serial No. 534,442. (No model.)

*To all whom it may concern:*

Be it known that I, JOSEPH FISH, a citizen of the United States of America, residing at Chicago, in the county of Cook and State of Illinois, have invented certain new and useful Improvements in Hack-Saws; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a hack saw frame with means for tightening the saw and holding the same in any position it may be desired to adjust it; and the invention consists in the construction and combination of the parts, as will be hereinafter fully set forth and particularly pointed out in the claims.

In the accompanying drawings, forming part of this specification, Figure 1 is a side elevation, partly in section. Fig. 2 is a sectional view on the line 2—2 of Fig. 1, and Fig. 3 is a detail view of one of the saw clamps detached.

A designates the saw frame which is made up of a single piece or bar of metal looped upon itself to provide a spring portion and a handle A' beyond which one end portion of the bar is flattened to provide the back $A^3$ while the other end is bent at an angle and provided with an eye or socket which is tapered and hexagonal, said eye being adapted to receive a correspondingly-shaped block or clamp C made up in two sections or halves. The under edge of the back $A^3$ is provided with rack-teeth $a$ and its outer end is provided with an angular cut having teeth on one edge to form a convenient wrench.

B designates a movable arm which is carried by the frame A and is recessed to receive a pivoted lever B' having teeth on one end which engage with the teeth $a$ on the under edge of the back. The arm B is provided to one side of the pivot for the lever B' with apertures through which passes a pin $b$ for locking the lever after it has been properly adjusted. The lower end of the arm B is provided with an eye or socket similar to the one formed in the lower end of the part $A^2$ of the frame A.

The clamps C which are adapted to fit into the tapered eyes or sockets in the saw frame are each made up of two sections, one of the sections having a projecting pin $c$ while the other is provided with a recess to receive said pin, the pin being adapted to pass through an aperture in the saw to hold said saw in engagement with the clamp.

In attaching a saw to the saw frame the ends of the saw are passed through the eyes and the clamps C placed in engagement therewith. The arm B is then moved along the back of the saw frame so that the clamps will enter the eyes after which a more rigid adjustment of the saw is made by operating the lever B' and locking the same in position by means of the pin $b$.

It will be noted that the handle A' is so constructed that the looped handle will give sufficiently when undue strain is placed upon the saw.

In case the saw should break the broken end can be held between the sections of the clamp the faces of which are preferably roughened for this purpose.

Having thus described my invention, what I claim as new, and desire to secure by Letters Patent, is—

1. A hack saw frame consisting of the part A made up of a rounded portion which is looped upon itself to provide a spring handle, a back $A^3$ which is flattened and provided on its under side with rack teeth $a$, a portion $A^2$ of rigid construction provided at its end with a socket, in combination with an arm B having pivoted thereto a toothed lever B', the lower end of said arm having a socket, and clamps C C, substantially as shown and for the purpose set forth.

2. A hack saw frame made up of the part A constructed substantially as shown and carrying a single arm which is adjustable thereon, the frame and arm having tapered sockets which are angular in cross-section, together with divided clamps C C each made up of separable and independent pieces which are adapted to fit into the sockets to hold a saw-blade in clamped engagement therewith, the clamps having pins $c$ and corresponding recesses substantially as described and for the purpose set forth.

In testimony whereof I affix my signature in presence of two witnesses.

JOSEPH FISH.

Witnesses:
H. H. VAN EVRA,
L. E. MCCALLEN.